(12) United States Patent
Ueda et al.

(10) Patent No.: US 8,487,847 B2
(45) Date of Patent: Jul. 16, 2013

(54) LIQUID CRYSTAL DISPLAY AND METHOD OF MANUFACTURING THE SAME

(75) Inventors: Kazuya Ueda, Kanagawa (JP); Tsuyoshi Kamada, Kanagawa (JP)

(73) Assignee: Sony Corporation, Tokyo (JP)

(*) Notice: Subject to any disclaimer, the term of this patent is extended or adjusted under 35 U.S.C. 154(b) by 899 days.

(21) Appl. No.: 12/328,337

(22) Filed: Dec. 4, 2008

(65) Prior Publication Data

US 2009/0146936 A1 Jun. 11, 2009

(30) Foreign Application Priority Data

Dec. 6, 2007 (JP) ................................ 2007-315746

(51) Int. Cl.
*G09G 3/36* (2006.01)

(52) U.S. Cl.
USPC ............. 345/87; 345/88; 345/89; 345/100; 345/101; 345/102; 345/103; 345/104

(58) Field of Classification Search
USPC ............................. 345/87–104; 349/136, 144
See application file for complete search history.

(56) References Cited

U.S. PATENT DOCUMENTS

| | | | |
|---|---|---|---|
| 4,840,460 A | 6/1989 | Bernot et al. | |
| 6,127,998 A * | 10/2000 | Ichikawa et al. | 345/100 |
| 6,583,777 B2 * | 6/2003 | Hebiguchi et al. | 345/92 |
| 6,618,033 B2 * | 9/2003 | Takafuji | 345/96 |
| 6,958,791 B2 * | 10/2005 | Shimoshikiryo | 349/85 |
| 7,710,523 B2 * | 5/2010 | Nakanishi et al. | 349/129 |
| 7,956,942 B2 * | 6/2011 | Lee | 349/38 |
| 2001/0040546 A1 * | 11/2001 | Ohmuro et al. | 345/87 |
| 2009/0066619 A1 * | 3/2009 | Chen | 345/87 |
| 2009/0096734 A1 * | 4/2009 | Huang et al. | 345/89 |

FOREIGN PATENT DOCUMENTS

| | | |
|---|---|---|
| JP | 02-000012 | 1/1990 |
| JP | HEI 08-179370 A | 7/1996 |
| JP | 3076938 | 6/2000 |
| JP | 2002-023199 | 1/2002 |
| JP | 2002-357830 | 12/2002 |
| JP | 2003-255305 | 9/2003 |
| JP | 2004-062146 A | 2/2004 |
| JP | 2006-119539 A | 5/2006 |
| JP | 2006-133577 A | 5/2006 |
| JP | 2006-189610 A | 7/2006 |
| JP | 2006-338024 A | 12/2006 |

OTHER PUBLICATIONS

Japanese Patent Office, Office Action issued in Patent Application JP 2007-315746, on Jan. 26, 2010.
Japanese Patent Office, Office Action issued in Patent Application JP 2007-315746, on Aug. 26, 2010.
Sang Soo Kim; 66.1: Invited Paper: The World's Largest (82-in.) TFT-LCD; SID 05 Digest.

* cited by examiner

*Primary Examiner* — Joseph Feild
*Assistant Examiner* — Linh N Hoffner
(74) *Attorney, Agent, or Firm* — Dentons US LLP

(57) ABSTRACT

A liquid crystal display capable of improving its viewing angle characteristic of luminance is provided. The liquid crystal display includes: a pair of signal lines extending so as to intersect to each other; a pixel provided for the pair of signal lines and configured of a plurality of sub pixels, each sub pixel including a liquid crystal element and a capacitive element; a driving element provided for each of the plurality of sub pixels so as to be connected to a corresponding pair of signal lines assigned to the pixel, and performs display driving by applying a voltage to the liquid crystal element based on a video signal; and a capacitance line provided for each of the plurality of sub pixels so as to be connected to one end of the capacitive element.

4 Claims, 10 Drawing Sheets

LIQUID CRYSTAL DISPLAY AND METHOD OF MANUFACTURING THE SAME

CROSS REFERENCE TO RELATED APPLICATIONS

The present invention contain subject matter related to Japanese Patent Application JP2007-315746 filed in the Japanese Patent Office on Dec. 6, 2007, the entire contents of which being incorporated herein by reference.

BACKGROUND OF THE INVENTION

1. Field of the Invention

The present invention relates to a liquid crystal display which is provided with a plurality of pixels including a liquid crystal element, and a method of manufacturing the same.

2. Description of the Related Art

In recent years, liquid crystal displays of VA (Vertical Alignment)-mode for example, in which vertical alignment liquid crystal is used, is proposed as a display monitor such as a liquid crystal television, notebook PC, car navigation, and so on. It is known that the VA-mode can realize a large viewing angle compared with the TN (Twisted Nematic)-mode because of its liquid crystal molecule with negative dielectric anisotropy, i.e., a state in which the dielectric constant in the direction of the major axis of molecule is less than the dielectric constant in the direction of the minor axis.

However, the VA-mode liquid crystal display has a disadvantage of luminance displacement, that is, the luminance ratio at the time that a display screen is viewed from a front direction is different from that at the time of viewed from an oblique direction. FIG. 11 is a graph showing a relationship between the gray scale (0 to 255) of a video signal and the luminance ratio (ratio against a luminance over 255 levels of gray scale) in the VA-mode liquid crystal display. As shown by an arrow P101 in the graph, there is a big difference between the luminance characteristic as viewed from the front direction (indicated by the curved line "Ys (0°)" in graph) and the luminance characteristic as viewed from the direction of 45 degrees (indicated by the curved line "Ys (45°)" in graph). It proves that the luminance is displaced higher when seen from the direction of 45 degrees than seen from the front direction. Such phenomenon is called "whitish" "wash out", or "color shift", etc., and is considered as the greatest defect of the VA-mode liquid crystal display. To solve the whitish, it is proposed to divide a unit pixel into a plurality of sub pixels so as to set the threshold of each sub pixel different from each other (what is called a multi-pixel structure). Various types of multi-pixel structures have been proposed so far, and Japanese Patent Application Publication No. H02-12, U.S. Pat. No. 4,840,460 and Japanese Patent No. 3076938 disclose multi-pixel structures in which what is called HT (halftone-gray scale) method based on capacitance coupling is applied. In the multi-pixel structure shown in these patent documents, the potential difference between the plurality of sub pixels is determined based on capacitance ratio. More specifically, the multi-pixel structure includes such circuit configuration as shown in FIG. 12, in which a pixel 120 constituted from a sub pixel 120A and a sub pixel 120B are disposed in an area surrounded by a pair of data line D and gate line G that intersect with each other. In the multi-pixel structure of this type, the sub pixels 120A and 120B have liquid crystal elements 122A and 122B and auxiliary capacitive elements 123A and 123B, respectively, and they are connected to the source of a common thin film transistor (TFT) element 121 that is shared by the sub pixels 120A and 120B. The liquid crystal elements 122A and 122B and the auxiliary capacitive elements 123A and 123B are connected in parallel to the TFT element 121. However, a coupling capacitance Cc is provided in series between the TFT element 121 and the sub pixel 120B. The data line D is connected the drain of the TFT element 121, and the gate line G is connected to the gate of the TFT element 121. Further, the other ends of the auxiliary capacitive elements 123A and 123B are connected to a common auxiliary capacitance line CL which is shared thereby. In such multi-pixel structure with the above-mentioned circuit configuration, the potential difference between the sub pixel 120A and the sub pixel 120B is determined based on the magnitude of the coupling capacitance Cc, so that the ratio of luminance between the sub pixel 120A and the sub pixel 120B at a certain gray scale is determined.

Japanese Patent Application Publication No. 2003-255305 discloses another example of multi-pixel structure. In the multi-pixel structure, the pretilt angle of a liquid crystal molecule is different between a plurality of sub pixels so that the threshold may become different between the plurality of sub pixels.

FIG. 13 shows an example of relationship between the gray scale of a video signal and display mode of the respective sub pixels in the multi-pixel structure of related arts. Here, it is shown that in the course of increasing gray scale (increase in luminance) from zero level (black display level) to 255 level (white display level), a part of a pixel (one of the sub pixels) is increasing its luminance first, then the remaining portion of the pixel (the other of the sub pixels) follows. With such a multi-pixel structure, as shown by an arrow P102 of FIG. 11, for example, the curved line "Ym(45°)", which indicates the luminance characteristic of the multi-pixel structure as viewed from the direction of 45 degrees, is more similar to the curved line "Ys (0°)" than the curved line "Ys (45°)", which indicates the luminance characteristic of ordinary pixel structures as viewed from the direction of 45 degrees. Thus, it proves that the whitish phenomenon has been suppressed.

Other than the above-mentioned multi-pixel structures, it is also possible for an ordinary pixel structure as shown in FIG. 14 to obtain the same half-tone effect as with the multi-pixel structures by dividing a unit frame of display into a plurality of sub frames (for example, two sub frames) along the time axis and obtaining a desired luminance by separately expressing a high luminance and a low luminance using the two sub frames at different times. In this manner, the whitish phenomenon is suppressed.

SUMMARY OF THE INVENTION

However, as for the multi-pixel structure in which the HT method utilizing capacitance coupling is employed, since the sub pixel 122B is connected to the data line D via the coupling capacitance Cc as typically shown in FIG. 12, the driving voltage falls by the coupling capacitance Cc, thereby causing a decrease in transmittance of the sub pixel 122B. Accordingly, the whole display screen also becomes dark. In addition, there is a worry of screen burn (or image persistence) because the liquid crystal layer of the liquid crystal display device is not directly connected to electrodes (floating).

In the case of Japanese Patent Application Publication No. 2003-255305, a multi-pixel structure in which the pretilt angle of a liquid crystal molecule differs between sub pixels are formed in such a manner that after sealing a UV curable monomer with a liquid crystal molecule into the liquid crystal layer, UV-irradiation is selectively applied several times using a photo mask while applying voltages of different magnitudes across each of the sub pixels. However, such a manufacturing method has a difficulty in alignment between the photo mask and the selected sub pixel to be irradiated and it is not so easy to obtain a given pretilt angle for each sub pixel. Further, since boundary of sub pixels becomes ambiguous, desired optical characteristics are hardly available.

As for the method applied in the pixel structure of FIG. 14 in which half-tone effect is obtained by dividing each unit frame along the time axis, effective resolution may decrease (when one unit frame is constituted from two pixels for example, the effective resolution is reduced to half). Alternatively, when one pixel is divided into sub frames by time, it is necessary to at least double the driving frequency to avoid flicker, thereby causing the disadvantages of increase in power consumption and unevenness in display luminance because of the slow-down of the ON/OFF operation by TFT.

The present invention has been devised in view of the above disadvantage, and it is desirable to provide a liquid crystal display which is simple in configuration and is capable of improving the viewing angle characteristic of luminance even when using, for example, a VA-mode liquid crystal. It is further desirable to provide a method of manufacturing a liquid crystal display in which the above-mentioned liquid crystal display can be fabricated more simply and with high precision.

According to an embodiment of the present invention, there is provided a first liquid crystal display including a pair of signal lines extending so as to intersect to each other, a pixel provided for the pair of signal lines and configured of a plurality of sub pixels respectively having a liquid crystal element and a capacitive element, a driving element provided for each of the plurality of sub pixels so as to be connected to a corresponding pair of signal lines assigned to the pixel, and performs display driving by applying a voltage to the liquid crystal element based on a video signal, and a capacitance line provided for each of the plurality of sub pixels so as to be connected to one end of the capacitive element. The other end of the capacitive element is connected to the driving element in common with the liquid crystal element, and the liquid crystal element includes liquid crystal molecules whose pretilt angles differ between the plurality of sub pixels which configures one pixel. It is to be noted that the pretilt angle is an initially aligned angle between the normal to a substrate surface and the major axis of a liquid crystal molecule.

In the first liquid crystal display of the embodiment of the present invention, since the liquid crystal molecule included in the liquid crystal element has a pretilt angle different between the plurality of sub pixels, each sub pixel exhibits a luminance different from one another at any gray scale. Here, each of the sub pixels is connected to the common signal lines via the driving element which is provided for each of the sub pixels one to one, thereby having more simple configuration. On the other hand, a plurality of driving elements are provided so as to correspond one to one to the sub pixels, and the capacitive element in each sub pixel is connected to its own capacitance line. With such a configuration, in the course of manufacturing, difference in the pretilt angle is set simply and accurately by applying a mutually different potential to the respective sub pixels via each capacitance line, with the driving elements closed.

According to an embodiment of the present invention, there is provided a second liquid crystal display including a pair of signal lines extending so as to intersect to each other, a pixel provided for the pair of signal lines and configured of a plurality of sub pixels respectively having a liquid crystal element and a capacitive element, a driving element provided for each of the plurality of sub pixels so as to be connected to a corresponding pair of signal lines assigned to the pixel, and performs display driving by applying a voltage to the liquid crystal element based on a video signal, and a capacitance line provided for the plurality of sub pixels in the pixel, and connected, in common, to every on end of all of the capacitive elements in the plurality of sub pixels. The other end of the capacitive element is connected to the driving element in common with the liquid crystal element, and a ratio of a capacitance between the liquid crystal element to a capacitance of the capacitive element and the capacitive element differs between the plurality of sub pixels which configures one pixel, and the liquid crystal element includes liquid crystal molecules whose pretilt angles differ between the plurality of sub pixels which configures one pixel.

In the second liquid crystal display of the embodiment of the present invention, since the liquid crystal molecule included in the liquid crystal element has a pretilt angle mutually different between the plurality of sub pixels, each sub pixel exhibits a luminance different from one another at any gray scale. Here, since each of the sub pixels is connected to the common signal lines via the driving element provided for each of the sub pixels one to one, and each capacitive element provided in the sub pixels is connected to the common capacitance line, configuration becomes more simple. On the other hand, a plurality of driving elements are provided so as to correspond one to one to the sub pixels. What is more, a ratio of a capacitance between the liquid crystal element and the capacitive element differs between the plurality of sub pixels. With such a configuration, when a potential is applied to the respective sub pixels via the capacitance line with the driving element closed in manufacturing, the magnitude of the applied potential differs between the sub pixels, thereby it becomes possible to set a difference of pretilt angles simply and accurately.

According to an embodiment of the present invention, there is provided, a first method of manufacturing a liquid crystal display including a pair of signal lines extending so as to intersect to each other, and a pixel provided for the pair of signal lines and configured of a plurality of sub pixels, each sub pixel having a liquid crystal element and a capacitive element. The method includes the following steps of:

(A) forming a driving element for each of the plurality of sub pixels, the driving element performing display driving by applying a voltage to the liquid crystal element based on a video signal, and connecting, in common, all of the driving elements formed in the pixel to a corresponding pair of signal lines assigned to the pixel;

(B) forming the liquid crystal element and the capacitive element so as to be connected, in common, to a corresponding driving element; and (C) forming a capacitance line for each of the plurality of sub pixels so as to be connected to the capacitive element at one end thereof opposite to the driving element. Here, the liquid crystal element is formed in such a manner that, after sealing, between a pair of electrode substrates, a liquid crystal layer containing polymerizable monomers and a liquid crystal molecules, each electrode substrate having an alignment film on its inner facing surface, all the monomers in the pixel are polymerized by one operation during an application of voltages which are mutually different between the plurality of sub pixels, the voltages being applied across the pair of electrode substrates by means of the capacitance line. It is to be noted that the above-mentioned steps (A) to (C) may be processed at the same time, or may be processed separately. In the case of separate processing, the order of processing can be determined arbitrarily among the steps (A) to (C).

In the first method of manufacturing the liquid crystal display of the embodiment of the present invention, the capacitance line is provided one-to-one for every sub pixel so that voltages different mutually between the sub pixels is applied across the pair of electrode substrates. Accordingly, the liquid crystal molecule is tilted with respect to the normal to the electrode substrate at an angle mutually different between the sub pixels. When the monomer in the liquid crystal layer is polymerized under such a condition, a polymer structure adhered to the electrode substrates on the side in contact with the liquid crystal layer is formed. The polymer structure brings about an effect of keeping the liquid crystal molecule tilted. As a result, the pretilt angle of the liquid crystal molecule differs mutually between the sub pixels in non-driving state.

According to an embodiment of the present invention, there is provided a second method of manufacturing a liquid crystal display including a pair of signal lines extending so as to intersect to each other, and a pixel provided for the pair of signal lines and configured of a plurality of sub pixels, each sub pixel including a liquid crystal element and a capacitive element. The method includes the following steps of:

(a) forming a driving element for each of the plurality of sub pixels, the driving element performing display driving by applying a voltage to the liquid crystal element based on a video signal, and connecting, in common, all of the driving elements formed in the pixel to a corresponding pair of signal lines assigned to the pixel;

(b) forming the liquid crystal element and the capacitive element so as to be connected, in common, to a corresponding driving element, so that ratio of a capacitance between the liquid crystal element and the capacitive element differs between the plurality of sub pixels; and (c) forming a common capacitance line so as to be connected to all the capacitive elements in the pixel at each one end thereof opposite to the driving element.

Here, the liquid crystal element is formed in such a manner that, after sealing, between a pair of electrode substrates, a liquid crystal layer containing polymerizable monomers and a liquid crystal molecules, each electrode substrate having an alignment film on its inner facing surface, all the monomers in the pixel are polymerized by one operation during an application of voltages which are mutually different between the plurality of sub pixels, the voltages being applied across the pair of electrode substrates utilizing the difference in the ratio of the capacitance between the liquid crystal element and the capacitive element (capacitance ratio). It is to be noted that the above-mentioned steps (a) to (c) may be processed at the same time, or may be processed separately. In the case of separate processing, the order of processing can be determined arbitrarily among the steps (a) to (c).

In the second method of manufacturing the liquid crystal display of the embodiment of the present invention, though one common capacitance line is shared by all the sub pixels, voltages mutually different between the sub pixels is applied across the pair of electrode substrates by means of the capacitance ratio mutually different between the sub pixels. Accordingly, the liquid crystal molecule is tilted with respect to the normal to the electrode substrate at an angle mutually different between the sub pixels. When the monomer in the liquid crystal layer is polymerized under such a condition, a polymer structure adhered to the electrode substrates on the side in contact with the liquid crystal layer is formed. The polymer structure brings about an effect of keeping the liquid crystal molecule tilted. As a result, the pretilt angle of the liquid crystal molecule differs mutually between the sub pixels in non-driving state.

According to the first and the second liquid crystal displays of the embodiments of the present invention, the liquid crystal molecule included in the liquid crystal element has a pretilt angle mutually different between the plurality of sub pixels. Accordingly, when the liquid crystal element in each pixel is display-driven, variation in gamma characteristic at the time that the display screen is viewed from an oblique direction can be alleviated, thereby improving the viewing angle characteristic of luminance. In this case, the plurality of sub pixels in each pixel are display-driven together based on a signal transmitted from the common pair of signal lines. As a result, compared with a case where the plurality of sub pixels are separately display-driven using a different driving voltage applied from different signal lines, the number of the pair of signal lines can be reduced, thereby improving the aperture ratio, and further, the number of the drivers for driving surplus signal lines can also be reduced, thereby realizing compactness.

Further, according to the first liquid crystal display of the embodiment of the present invention, potentials mutually different between the plurality of sub pixels can be applied to the liquid crystal element included in the sub pixels via separate capacitance lines, with the driving elements closed. In this manner, it becomes possible to simply and accurately set the pretilt angle peculiar to each of the sub pixels in the course of manufacturing. As a result, excellent viewing angle characteristic of luminance can be exhibited.

The second liquid crystal display of the embodiment of the present invention is also configured so that, because of the difference of capacitance ratio between the sub pixels, potentials mutually different can be applied to the liquid crystal elements in each of the sub pixels via the capacitance line, with the driving elements closed. With such a configuration, as with the first liquid crystal display, it becomes possible to simply and accurately set the pretilt angle peculiar to each of the sub pixels in the course of manufacturing. As a result, excellent viewing angle characteristic of luminance can be exhibited.

According to the first method of manufacturing the liquid crystal display of the embodiment of the present invention, the capacitance line is provided one-to-one for every sub pixel and voltages different mutually between the sub pixels are applied across the pair of electrode substrates so that the liquid crystal molecules included in the liquid crystal layer of each sub pixel may be tilted at a given angle. Then, the monomer in the liquid crystal layer is polymerized by one operation (not divided along the time axis) under such a condition. In this manner, it becomes possible to set the pretilt angle peculiar to each of the sub pixels more simply and accurately than a case where the monomer is polymerized selectively (divided along the time axis) for each sub pixel using a photo mask and so on. In this case, there is no need of utilizing the pair of signal lines. As a result, it becomes relatively easy to realize the liquid crystal display which has a multi-pixel structure with a simple configuration, in which excellent viewing angle characteristic of luminance can be exhibited.

According to the second method of manufacturing the liquid crystal display of the embodiment of the present invention, voltages mutually different between the sub pixels are applied across the pair of electrode substrates via the common capacitance line shared by all the sub pixels, using the mutually different capacitance ratio so that the liquid crystal molecules included in each sub pixel may be tilted at a given angle. Since the monomer in the liquid crystal layer is polymerized under such a condition by one operation (not divided along the time axis), it becomes possible to set the pretilt angle peculiar to each of the sub pixels more simply and accurately than a case where the monomer is polymerized selectively (divided along the time axis) for each sub pixel using a photo mask and so on. There is no need of utilizing the pair of signal lines in this case. As a result, it becomes relatively easy to realize the liquid crystal display which has a multi-pixel structure with a simple configuration, in which excellent viewing angle characteristic of luminance can be exhibited.

Other and further objects, features and advantages of the invention will appear more fully from the following description.

DESCRIPTION OF THE PREFERRED EMBODIMENTS

Embodiments of the invention will be described in detail hereinbelow with reference to the drawings.

First Embodiment

Figure 1:
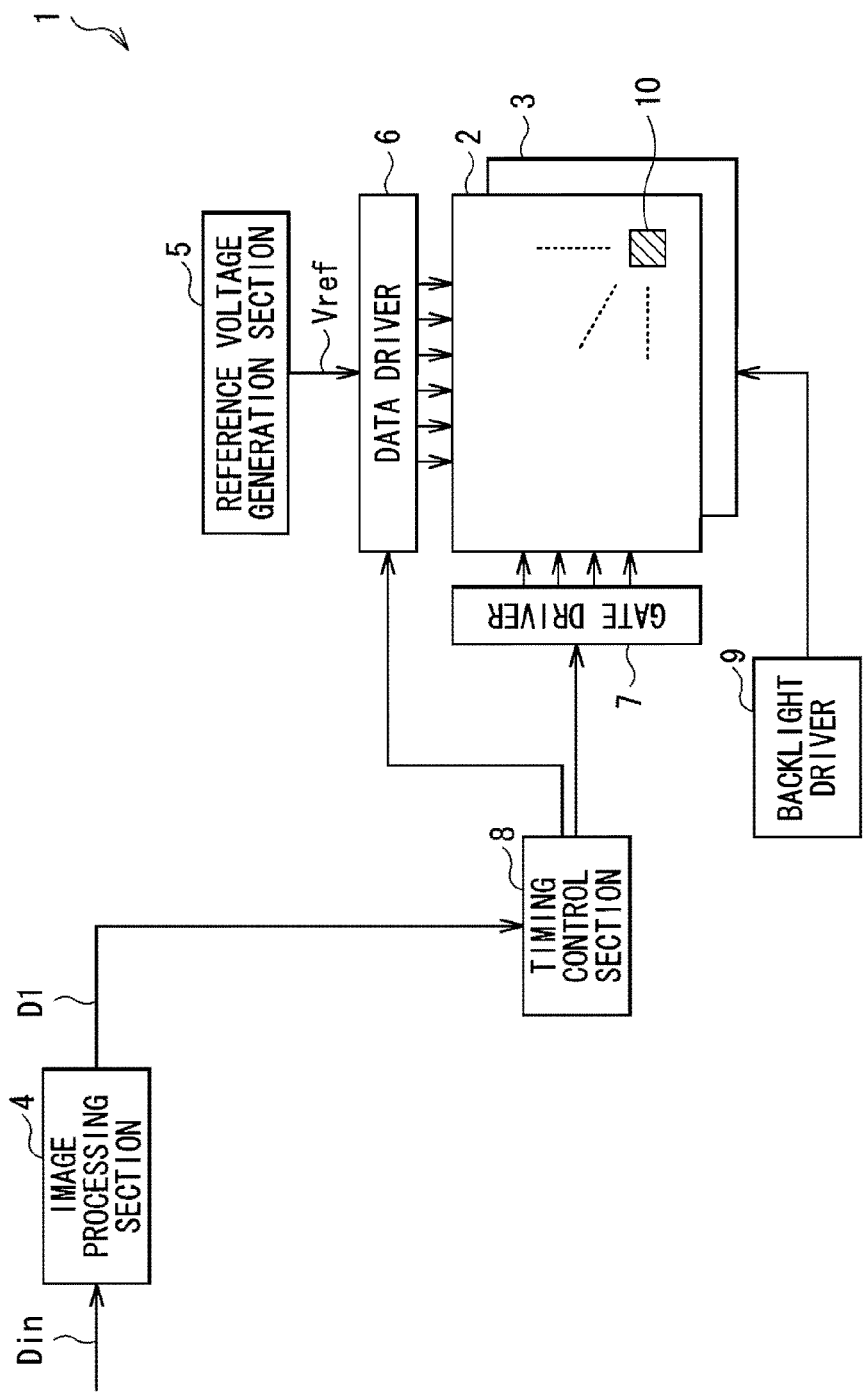
FIG. 1 is a block diagram showing a whole configuration of a liquid crystal display according to a first embodiment of the present invention.

FIG. 1 shows a whole configuration of a liquid crystal display (LCD 1) as a first embodiment of the present invention. The liquid crystal display 1 includes a liquid crystal display panel 2, a back light section 3, an image processing section 4, a reference voltage generation section 5, a data driver 6, a gate driver 7, a timing control section 8, and a back light driver 9.

The back light section 3 is a light source for illuminating the liquid crystal display panel 2, and configured to have a CCFL (cold cathode fluorescent lamp) an LED (light emitting diode), and so on.

The liquid crystal display panel 2 displays an image based on a video signal Din by modulating light emitted from the back light section 3 in accordance with a driving voltage supplied from the data driver 6 according to a driving signal supplied from an after-mentioned gate driver 52. The liquid crystal display panel 2 includes a plurality of pairs of signal lines (gate lines G and data lines D) intersecting each other to form a matrix as a whole, a plurality of pixels 10 arranged along with these gate lines G and data lines D. The gate line G is an electric wiring for line-sequentially selecting the pixels 10 to be driven, and the data line D is an electric wiring which supplies the driving voltage applied from the data driver 6 to the pixel 10 to be driven. The pixels 10 are constituted from color pixels corresponding to R (red), G (green), and B (blue), that is, those to which red, green and blue color filters (not shown) are attached respectively for emitting red, green and blue display lights. Each of the pixels 10 includes a pixel circuit including two sub pixels (after-mentioned sub pixels 10A and 10B). Configuration of the pixel circuit will be mentioned in detail later with reference to FIG. 2 and FIG. 3.

The image processing section 4 performs a specified image processing on the video signal Din transmitted from outside so as to generate a video signal D1 as an RGB signal.

The reference voltage generation section 5 supplies a reference voltage Vref used in the after-mentioned D/A (digital/analog) conversion to the data driver 6. Specifically, the reference voltage Vref is constituted from a plurality of reference voltages from a black voltage (voltage for a luminance level when the gray scale is "zero" as mentioned below) to a white voltage (voltage for a luminance level when the gray scale is "255" for example, as mentioned below). In the present embodiment, the reference voltage Vref is used in common among the respective R, G and B pixels. The reference voltage generation section 5 is typically formed as a resistance tree structure, in which a plurality of resistors are connected in series.

The gate driver 7 line-sequentially drives pixels 10 in the liquid crystal display panel 2 along not-shown scanning lines (gate lines G) based on the timing control by the timing control section 8.

The data driver 6 supplies the driving voltage based on the video signal D1, which is supplied via the timing control section 8 from the image processing section 4, to each of the pixels 10 (more specifically, to each of the sub pixels 10A and 10B in each of the pixels 10) of the liquid crystal display panel 2. Specifically, the data driver 6 generates the video signal (above-mentioned driving voltage) as an analog signal specifically by performing D/A conversion on the video signal D1 using the reference voltage Vref supplied from the reference voltage generation section 5, and outputs the signal to the pixels 10, respectively.

The back light driver 9 controls the lighting operation of the back light section 3. The timing control section 8 controls the drive timing of the gate driver 7 and the data driver 6, and also supplies the video signal D1 to the data driver 6.

Figure 2:
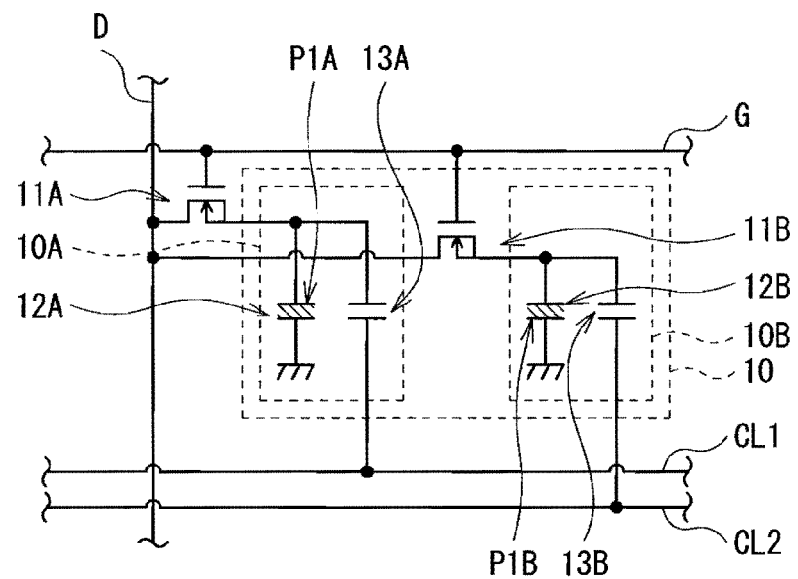
FIG. 2 is a circuit diagram showing a detailed configuration of a pixel appearing in FIG. 1.
Figure 3:
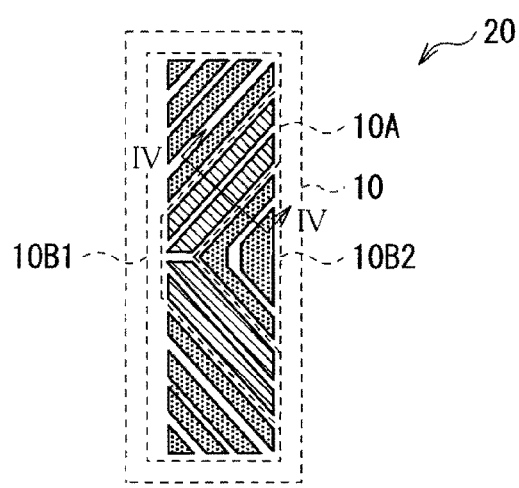
FIG. 3 is a plan view showing a configuration of a pixel electrode provided in a liquid crystal element appearing in FIG. 2.

Next, configuration of the pixel circuit which is formed in the respective pixels 10 will be explained in detail with reference to FIG. 2 and FIG. 3. FIG. 2 is an example of a circuit diagram of the pixel circuit formed in the pixel 10. FIG. 3 is an example of a planar configuration of a pixel electrode, which is provided in a liquid crystal element in the pixel circuit.

The pixel 10 is a multi-pixel structure in which two sub pixels 10A and 10B constitute the pixel 10. The sub pixel 10A includes a liquid crystal element 12A as a main capacitive element and an auxiliary capacitive element 13A, and the sub pixel 10B has a liquid crystal element 12B as the main capacitive element and an auxiliary capacitive element 13B. Thin-film transistors (TFT) 11A and 11B are provided for the sub pixels 10A and 10B, respectively. The liquid crystal element 12A and the auxiliary capacitive element 13A are connected to the TFT element 11A in parallel, and the liquid crystal element 12B and the auxiliary capacitive element 13B are connected to the TFT element 11B in parallel.

Each of the pixels 10 is connected to a pair of gate line G and data line D, and two auxiliary capacitance lines CL1 and CL2, which are bus lines for supplying a specified reference potential to counter electrode sides of the auxiliary capacitive elements 13A and 13B. The TFT elements 11A and 11B are connected to the common gate line G and the common data line D shared by the TFT elements 11A and 11B.

The liquid crystal elements 12A and 12B function as a display element which performs a display operation (emitting displaying light) according to the driving voltage, which is supplied from the data line D to one ends of the liquid crystal elements 12A and 12B via the TFT elements 11A and 11B, respectively. The liquid crystal elements 12A and 12B include a liquid crystal layer 40 (which will be described later) constituted from a VA-mode liquid crystal material and a pair of electrodes (a pixel electrode 20 and a counter electrode 30, as will be mentioned later) which sandwich the liquid crystal layer 40 in between. Preferably, the capacitance of the liquid crystal element 12A (LC capacitance Clc1) and the capacitance of the liquid crystal element 12B (LC capacitance Clc2) are equal to each other. The pixel electrode 20 (electrode on a side indicated by reference numerals P1A and P1B in FIG. 2) is connected to the source of TFT elements 11A and 11B and one ends of the auxiliary capacitive elements 13A and 13B. The counter electrode 30 (electrode disposed on an opposite side of the reference numerals P1A and P1B in FIG. 2) is grounded. The pixel electrode 20 has a planar configuration as shown, for example in FIG. 3, and is constituted from a pixel electrode 20A corresponding to the sub pixel 10A and a pixel electrode 20B corresponding to the sub pixel 10B (10B1, 10B2). Detailed configuration of the liquid crystal elements 12A and 12B will be mentioned below.

The auxiliary capacitive elements 13A and 13B are capacitive elements for promoting stabilization in stored charge for the liquid crystal elements 12A and 12B, and have auxiliary capacitance Cs1 and Cs2, respectively. Preferably, the ratio between the auxiliary capacitance Cs1 and the auxiliary capacitance Cs2 is the same as the ratio of area between the sub pixel 10A and the sub pixel 10B so as to decrease difference between the feed through voltage in the sub pixel 10A and the feed through voltage in the sub pixel 10B as much as possible, thereby avoiding disagreement between the optimum counter voltage (potential difference between the pixel electrode 20 and the counter electrode 30) in the sub pixel 10A and the optimum counter voltage in the sub pixel 10B. One end (one of the electrodes) of the auxiliary capacitive element 13A is connected to one end of the liquid crystal element 12A and the source of the TFT element 11A, and the other end (counter electrode) is connected to the auxiliary capacitance line CL1. One end (one of the electrodes) of the auxiliary capacitive element 13B is connected to one end of the liquid crystal element 12B and the source of TFT element 11B, and the other end (counter electrode) is connected to the auxiliary capacitance line CL2.

The TFT element 11A is typically constituted from an MOS-FET (Metal Oxide Semiconductor-Field Effect Transistor), in which the gate is connected to the gate line G, the source is connected to one end of the liquid crystal element 12A and one end of the auxiliary capacitive element 13A, and the drain is connected to the data line D. The TFT element 11A functions as a switching element for supplying the driving voltage to the one ends of the liquid crystal element 12A and the auxiliary capacitive element 13A, based on the video signal D1. Specifically, it is configured so that electric connection is selectively established between the data line D and one ends of the liquid crystal element 12A and the auxiliary capacitive element 13A in accordance with a selection signal supplied from the gate driver 7 via the gate line G.

Similarly, the TFT element 11B is typically constituted from the MOS-FET, in which the gate thereof is connected to the gate line G, the source thereof is connected to the one ends of the liquid crystal element 12B and auxiliary capacitive element 13B, and the drain is connected to the data line D. The TFT element 11B functions as a switching element for supplying the driving voltage to the ends of the liquid crystal element 12B and the auxiliary capacitive element 13B, based on the video signal D1. Specifically, it is configured so that electric connection is selectively established between the data line D and the ends of the liquid crystal element 12B and the auxiliary capacitive element 13B in accordance with the selection signal supplied from the gate driver 7 via the gate line G.

Figure 4:
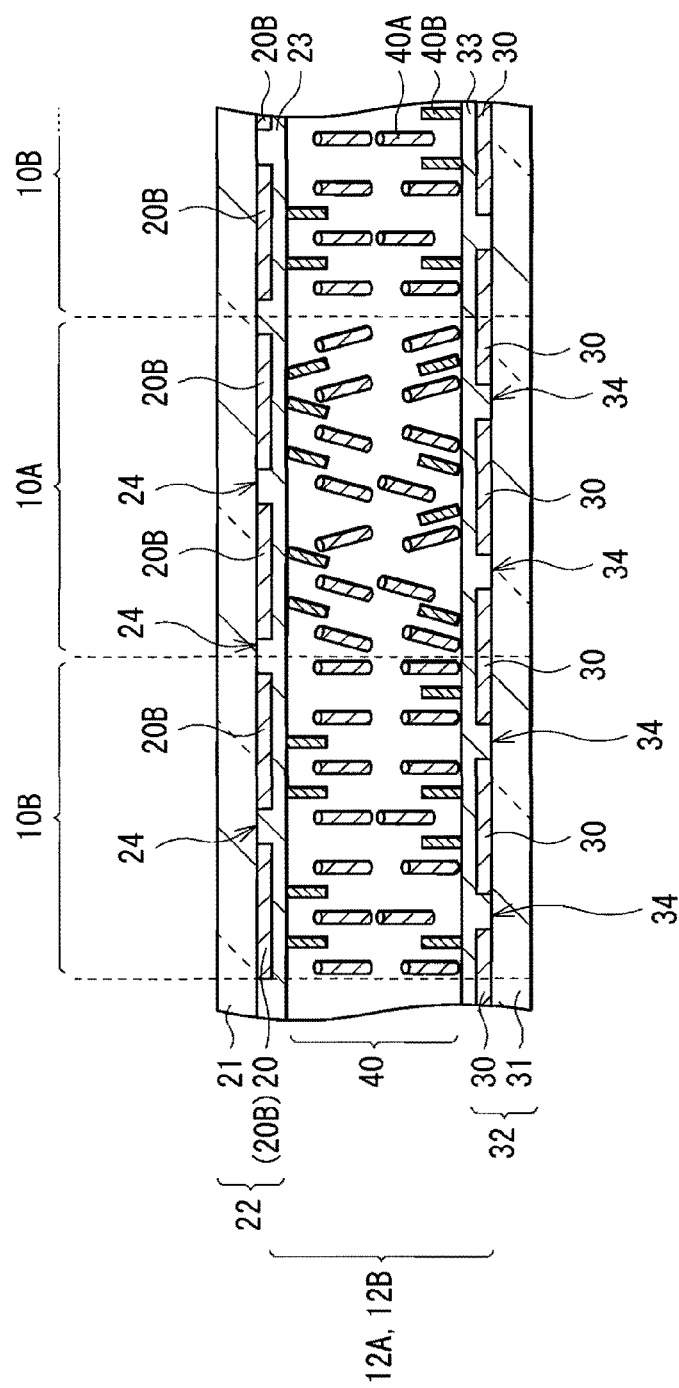
FIG. 4 is a cross section view of the liquid crystal display of FIG. 1.

Next, configuration of the liquid crystal elements 12A and 12B will be explained in detail with reference to FIG. 4. FIG. 4 is a sectional view showing a principal portion of a liquid crystal display 1 including the liquid crystal elements 12A and 12B, taken along the line IV-IV of FIG. 3, as seen from the direction indicated by the arrows.

Figure 5:
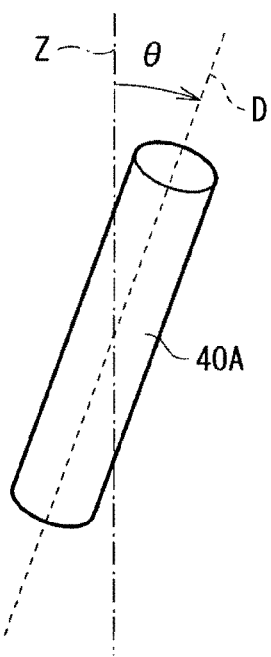
FIG. 5 is a pattern diagram for explaining a pretilt angle of a liquid crystal molecule.
Figure 6:
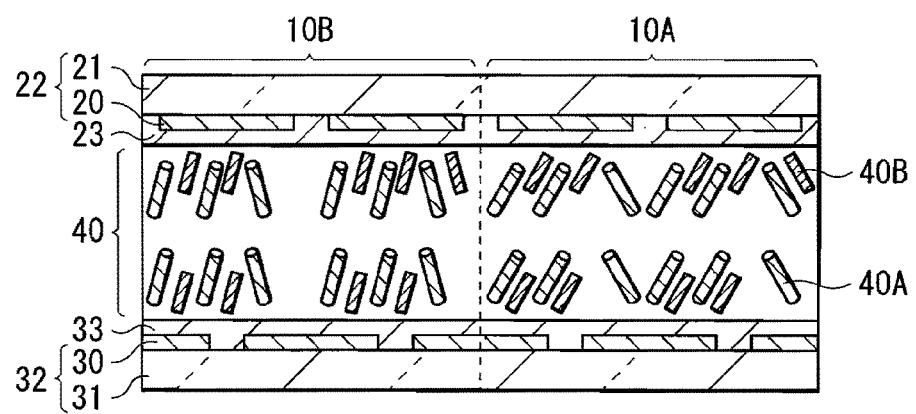
FIG. 6 is a cross section view of another configuration example in an embodiment of the present invention.
Figure 8:
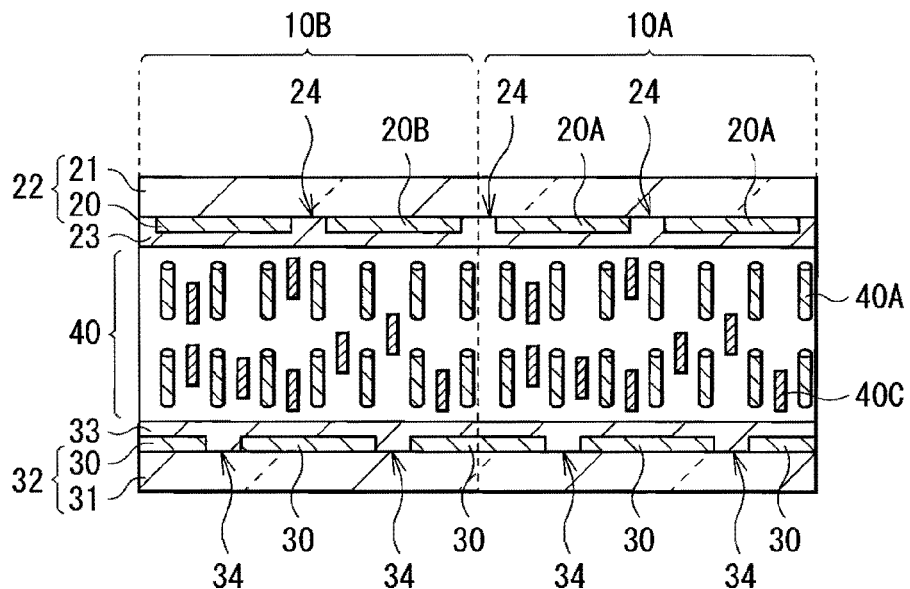
FIG. 8 is a cross section view for explaining the method of manufacturing the liquid crystal display of FIG. 1.
Figure 9:
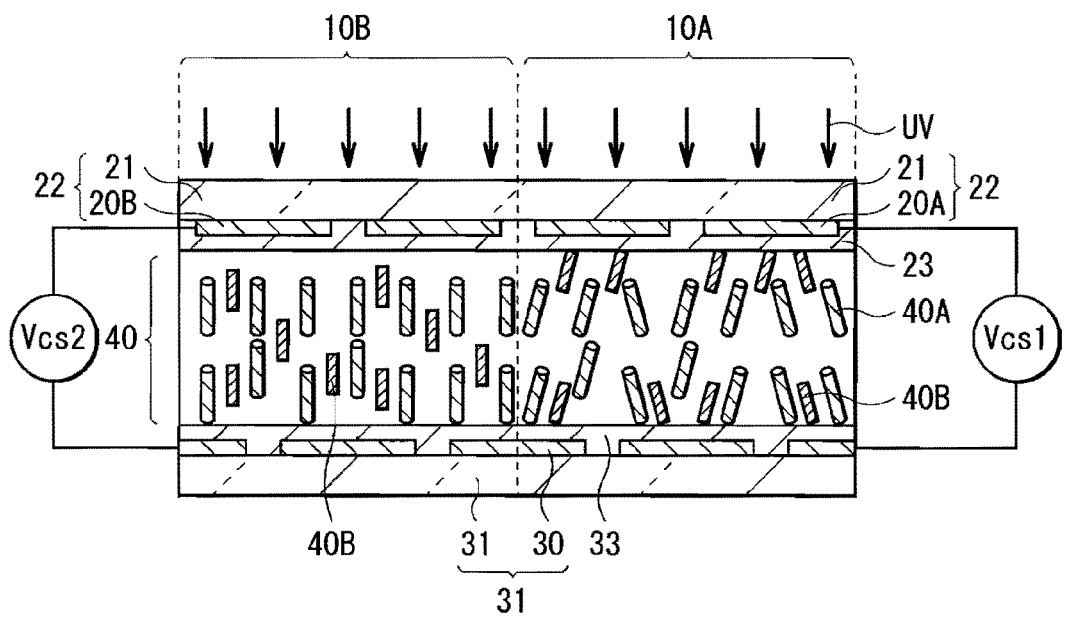
FIG. 9 is a cross section view for explaining a step subsequent to FIG. 8.

The liquid crystal display 1 is configured in such a manner that a liquid crystal layer 40 is provided between a TFT substrate 22 and a CF (color filter) substrate 32 with alignment films 23 and 33 in between. Two or more liquid crystal molecules 40A are included in the liquid crystal layer 40, and the pretilt angle of the liquid crystal molecules is different between an area corresponding to the sub pixel 10A and an area related to the sub pixel 10B. It is to be noted that, when the direction perpendicular to the substrate plane is defined as "Z", the pretilt angle is a tilt angle θ between the "Z" direction and the long axis direction "D" of the liquid crystal molecule 40A, as shown in FIG. 5. Although a plurality of pixels are provided between the substrates in the liquid crystal display 1, only one pixel is illustrated in FIGS. 6, 8 and 9 shown below to avoid complexity for description, and illustration of detailed configuration of the TFT substrate 22 and the CF substrate 32 is omitted in FIGS. 4, 6, 8 and 9.

The TFT substrate 22 is typically configured in such a manner that a plurality of pixel electrodes 20 are arranged in matrix on a glass substrate 21. The TFT substrate 22 further includes the TFT elements 11A and 11B (not shown in FIG. 4) which drive the plurality of pixel electrodes 20 respectively, the gate lines and the source lines (not shown in FIG. 4) which are connected to the TFT elements 11A and 11B, and so on. The pixel electrode 20 is provided for each of the sub pixels 10A and 10B on the glass substrate 21, and is typically made of a transparent conductive material such as ITO (indium-tin oxide). A slit portion 24 (portion in which no electrode is formed), which is patterned like a stripe shape or a V-shape for example, is formed in the pixel electrode 20 within each of the sub pixels.

The CF substrate 32 is configured in such a manner that a red (R), green (G) and blue (B) color filters (not shown) are arranged in the form of a stripe for example, and the counter electrodes 30 are arranged on almost all over the effective display area, on a glass substrate 31. The counter electrode 30 is typically made of a transparent conductive material such as ITO (indium-tin oxide). A slit portion 34 patterned similar to that of the above-mentioned pixel electrode 20 is formed within each of the sub pixels. In this case, the slit portions 24 and 34 formed in the pixel electrode 20 and the counter electrode 30 are located so as not to face each other in a stacking direction (direction perpendicular to the substrate planes). With such a configuration, when the driving voltage is applied, electric field is applied diagonally with respect to the major axis of the liquid crystal molecule 40A, thereby response to voltage improves more. Further, since two or more areas in which alignment direction is different from each other (divided alignment) are formed within one pixel, viewing angle characteristic is improved.

The liquid crystal layer 40 is constituted of a vertical alignment liquid crystal material, and typically includes the liquid crystal molecule 40A having a negative dielectric anisotropy and a polymer structure 40B, which has a function of holding the liquid crystal molecule 40A in the vicinity of interface with the alignment films 23 and 33. The liquid crystal molecule 40A has a characteristic that the dielectric constant in the direction of the major axis is larger than the dielectric constant in the direction of the minor axis. Because of the characteristic, when the driving voltage is OFF, the liquid crystal molecule 40A is aligned so that its major axis may be perpendicular to the substrate. When the driving voltage is set to ON, the liquid crystal molecule 40A is aligned so that its major axis may be parallel to the substrate. The polymer structure 40B is made of a polymer material, which is formed by polymerizing monomers such as ethoxylated biphenol diacrylate (concretely, "NK ESTER A-BP-2E" (trade name) of Shin-Nakamura Chemical Co., Ltd.), for example.

The pretilt angle of the liquid crystal molecule 40A, which is held by the polymer structure 40B, is larger in the sub pixel 10A than in the sub pixel 10B. Preferably, the liquid crystal molecule 40A within the sub pixel 10A has a pretilt angle θ1 of, for example, ten degrees. With such a configuration, response to voltage at the time of a lower-level gray scale can be raised more effectively.

Meanwhile, the liquid crystal molecule 40A within the sub pixel 10B has a pretilt angle θ2 of zero degree. Namely, major axis direction of the liquid crystal molecule 40A is aligned vertically to the substrate plane. Even when the pretilt angle θ2 of the liquid crystal molecule 40A within the sub pixel 10B is larger than zero degree, it is enough if the pretilt angle θ2 is smaller than the pretilt angle θ1 (θ1>θ2) of the liquid crystal molecule 40A within the sub pixel 10A, as shown in FIG. 6.

The alignment films 23 and 33 are typically made of an organic material such as polyimide, and is a vertical alignment film by which the liquid crystal molecule 40A is aligned vertically to the substrate plane. A process such as rubbing may be given to the alignment films 23 and 33 to regulate the alignment direction thereof.

Next, operation of the liquid crystal display 1 of the present embodiment having such a configuration will be described in detail with reference to FIGS. 1 to 4.

In the liquid crystal display 1, as shown in FIG. 1, a video signal Din from the outside is processed by the image processing section 4 to generate the video signal D1 for each pixel 10. The video signal D1 is supplied to the data driver 6 via the timing control section 8. The data driver 6 performs a D/A conversion to the video signal D1 using a reference voltage Vref supplied from the reference voltage generation section 5, thereby generating an analog video signal. Then, based on the analog video signals, the driving voltage is applied from the gate driver 7 and the data driver 6 to the sub pixels 10A and 10B in each pixel 10, thereby display driving operation is performed for each pixel 10 in a line-sequential manner. Specifically, ON/OFF of the TFT elements 11A and 11B is switched in accordance with a selection signal which is supplied from the gate driver 7 via the gate line G, as shown in FIGS. 2 and 3 so that electrical connection is selectively established between the data line D and the liquid crystal elements 12A and 12B, and between the data line D and the auxiliary capacitive elements 13A and 13B. As a result, the driving voltage is applied to the liquid crystal elements 12A and 12B and the auxiliary capacitive elements 13A and 13B, based on the analog video signal which is supplied from the data driver 6, thereby performing the display driving.

Then, in the pixel 10 in which electric connection is established from the data line D to the liquid crystal elements 12A and 12B, and from the data line D to the auxiliary capacitive elements 13A and 13B, illumination light from the back light section 3 is modulated through the liquid crystal display panel 2 and outputted as a display light. In this manner, images are displayed on the liquid crystal display 1, based on the video signal Din.

Since the pretilt angle of the liquid crystal molecule 40A is different from each other between the sub pixel 10A and sub pixel 10B in the liquid crystal display 1 as shown in FIG. 4, based on an analog video signal, each pixel 10 is display-driven in such a manner as to be spacially divided into two for the sub pixels 10A and 10B, thereby luminance at any level of the gray scale is different between the sub pixels 10A and 10B. Namely, when the liquid crystal elements 12A and 12B in each pixel 10 are display-driven, variation in gamma characteristic at the time that the display screen is viewed from an oblique direction can be alleviated, thereby improving the viewing angle characteristic of luminance. In this case, since the sub pixels 10A and 10B in each pixel 10 are display-driven together based on a signal transmitted from the common data line D and gate line G, compared with a case where the plurality of sub pixels are separately display-driven using a different driving voltage applied from a different data line D and gate line G, the number of the data lines D and gate lines G can be reduced, thereby improving the aperture ratio, what is more, the number of the drivers for driving surplus data lines D and gate lines G can also be reduced, thereby facilitating compactness. Since TFT elements 11A and 11B are provided for the sub pixels 10A and 10B, respectively, it seems as if improvement in aperture ratio were disturbed. As a matter of fact, however, the TFT elements 11A and 11B are half as small as a common TFT element, which is shared by both of the sub pixels 10A and 10B, thereby there is no difference in the area occupied by the TFT elements as the whole.

Figure 7:
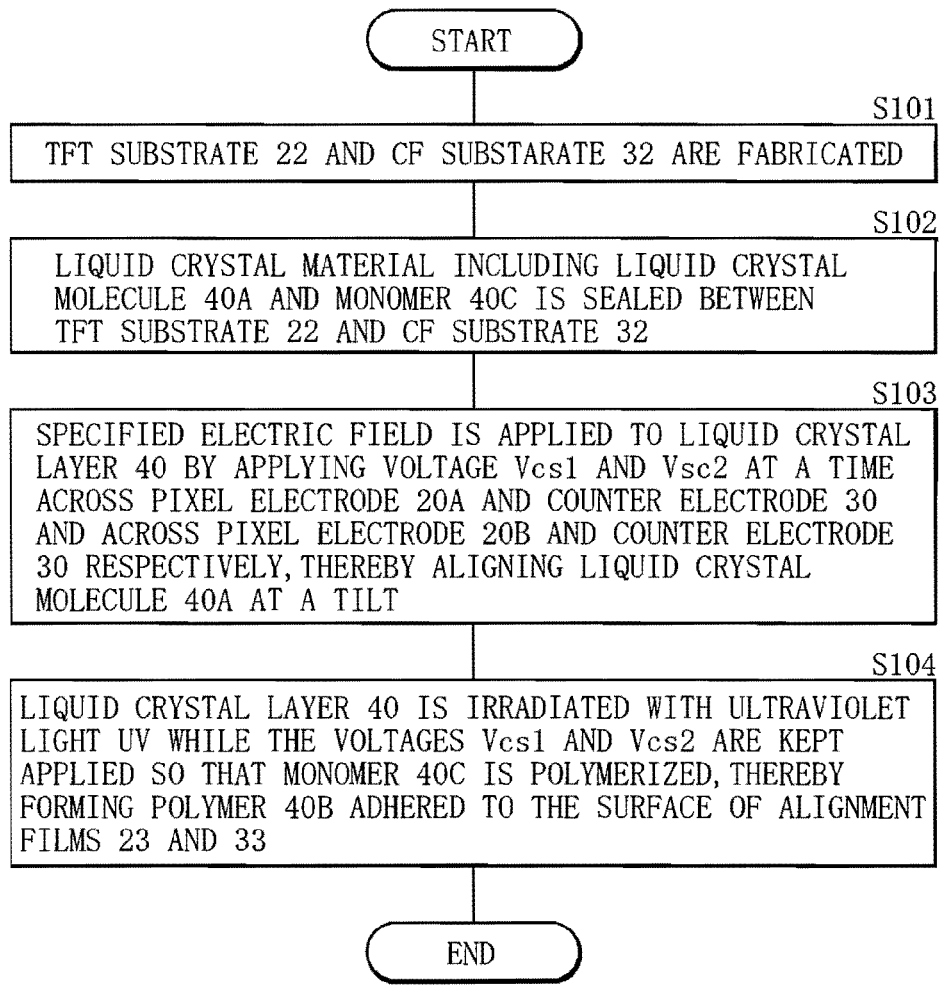
FIG. 7 is a flow chart for explaining a method of manufacturing the liquid crystal display of FIG. 1.

Next, a method of manufacturing the liquid crystal display 1 is explained with reference to the flow chart shown in FIG. 7 together with the cross section views shown in FIGS. 8 and 9. It is to be noted that only one pixel is shown in FIGS. 8 and 9 for simplification.

First, the TFT substrate 22 and the CF substrate 32 are produced (step S101). Specifically, the TFT elements 11A and 11B are produced by forming the gate line G, a gate insulating film, an amorphous silicon, the data line D and a final protective film (none of them are illustrated) in order on the glass substrate 21. Then, the pixel electrodes 20A and 20B, each having the slit portion 24, are formed in areas corresponding to the sub pixels 10A and 10B and connected to the TFT elements 11A and 11B, respectively, thereby the TFT substrate 22 is obtained. At this time, the auxiliary capacitive elements 13A and 13B and the auxiliary capacitance lines CL1 and CL2 are formed simultaneously with the TFT elements 11A and 11B. On the other hand, color filters (not shown) and the counter electrode 30 having the slit portion 34 are formed in a specified position on the glass substrate 31, thereby the CF substrate 32 is obtained.

After forming the TFT substrate 22 and the CF substrate 32, the liquid crystal layer 40 is sealed between the TFT substrate 22 and the CF substrate 32 with the alignment films 23 and 33 in between (step S102), as shown in FIG. 8.

Specifically, the alignment film 23 is formed on the surface plane of the pixel electrode 20 and the alignment film 33 is formed on the surface of the counter electrode 30 through such process as coating a vertical alignment agent and printing and burning a vertical alignment film on the substrates. Meanwhile, a liquid crystal material is produced by mixing the liquid crystal molecule 40A and a monomer 40C as a material of the liquid crystal layer 40. The monomer 40C has a nature that it is polymerized and become a polymer 40B under irradiation of ultraviolet ray (radical polymerization). Further, photopolymerization initiator (radical polymerization initiator) etc. may be added to the liquid crystal material. Subsequently, a spacer projection such as a plastic bead etc. for securing a cell gap is scattered to a surface plane of one of the alignment films 23 and 33 of the TFT substrates 22 and the CF substrate 32. Then, a sealing portion is printed using an epoxy adhesive and so on by screen printing. After that, the TFT substrate 22 and the CF substrate 32 are bonded together with the spacer projection and the sealing portion in between so that the alignment films 23 and 33 may face each other, then the above-mentioned liquid crystal material is injected therein. Then, the liquid crystal material is sealed between the TFT substrate 22 and CF substrate 32 by heating and hardening the sealing portion.

Next, as shown in FIG. 9, a specified electric field is applied to the liquid crystal layer 40 by applying voltage Vcs1 and Vcs2 at a time across the pixel electrode 20A and the counter electrode 30 and across the pixel electrode 20B and the counter electrode 30 respectively, thereby tilting the liquid crystal molecule 40A (step S103) Specifically, mutually different voltages Vcs1 and Vcs2 are applied to the sub pixels 10A and 10B respectively by setting the reference potential of the auxiliary capacitance lines CL1 and CL2 to a different value from each other, under the condition that the TFT elements 11A and 11B are closed and voltage application from the data line D is set to 0 V. In this manner, an electric field is applied in a direction forming a specified angle with the surface plane of the glass substrates 21 and 31, thereby making the liquid crystal molecule 40A aligned in a given direction with respect to the normal to the glass substrates 21 and 31. Here, it is to be noted that the tilt angle of the liquid crystal molecule 40A is different between the area corresponding to the sub pixel 10A and the area corresponding to the sub pixel 10B. The pretilt angles θ1 and θ2 are controllable by adjusting the magnitude of voltages Vcs1 and Vcs2 appropriately. FIG. 9 illustrates a case where the voltage Vcs2 applied across the pixel electrode 20B and the counter electrode 30 is set to 0 so that the pretilt angle θ2 of the liquid crystal molecule 40A in the sub pixel 10B may be set to 0.

Further, the liquid crystal layer 40 is irradiated with ultraviolet light UV from the outside of the TFT substrate 22 for example while the voltages Vcs1 and Vcs2 are kept applied so that the monomer 40C is polymerized, thereby forming the polymer 40B adhered to the surface of the alignment films 23 and 33 (step S104). The polymer 40B formed in such manner is chemically bonded to the alignment films 23 and 33 and have a function of holding the pretilt angles θ1 and θ2 of the liquid crystal molecule 40A in the vicinity of interface with the alignment films 23 and 33 within the liquid crystal layer 40 in a non-driving state. It is to be noted that the auxiliary capacitance lines CL1 and CL2 may be connected after forming the polymer 40B.

The liquid crystal display 1 appearing in FIG. 1 is completed through the above-mentioned fabrication process. Thus, according to the method of manufacturing the liquid crystal display of the present embodiment, the auxiliary capacitance lines CL1 and CL2 are provided for the sub pixels 10A and 10B respectively, then different voltages Vcs1 and Vcs2 are applied to the respective sub pixels 10A and 10B using the auxiliary capacitance lines CL1 and CL2, and the monomer 40C in the liquid crystal layer 40 is polymerized at a time (without divided by time) while the respective liquid crystal molecules 40A, which is included in the liquid crystal layer 40 of the respective sub pixels 10A and 10B, are tilted at a specified angle. In this manner, it becomes possible to determine the pretilt angles θ1 and θ2 for the respective sub pixels 10A and 10B more simply and more accurately than the case where polymerization is selectively carried out (divided by time) for each sub pixel using a photo mask or the like. Since neither of the data line D nor the gate line G are needed at that time, it is not necessary to provide the data line D and the gate line G respectively for the sub pixels 10A and 10B. As a result, it becomes possible to realize the liquid crystal display 1 which is more simple in configuration and has a multi-pixel structure in which excellent viewing angle characteristic of luminance can be exhibited. The auxiliary capacitance lines CL1 and CL2 are used as the electrodes independent of each other only at the time of a manufacturing process, and after the manufacturing, are used as the electrodes having the same electric potential so that the driving system of the related art is applicable to the liquid crystal display.

Second Embodiment

Figure 10:
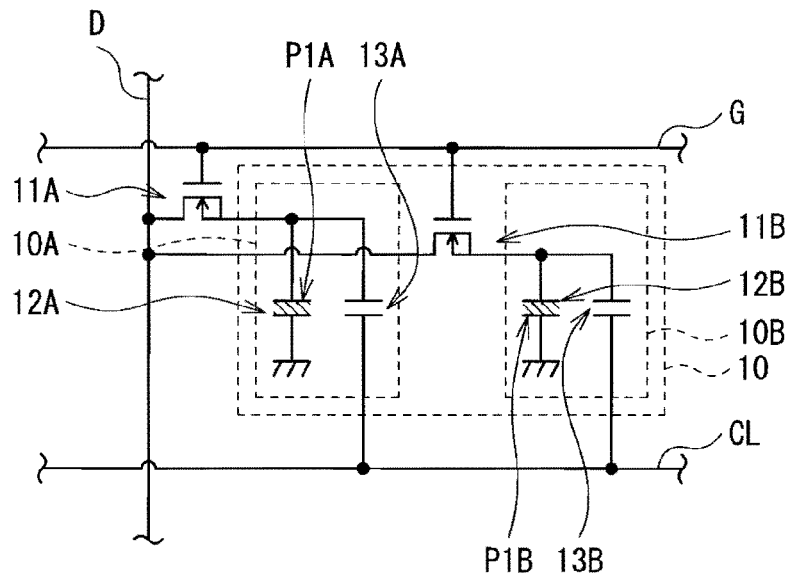
FIG. 10 is a circuit diagram showing a detailed configuration of a pixel in a liquid crystal display according to a second embodiment of the present invention.
Figure 11:
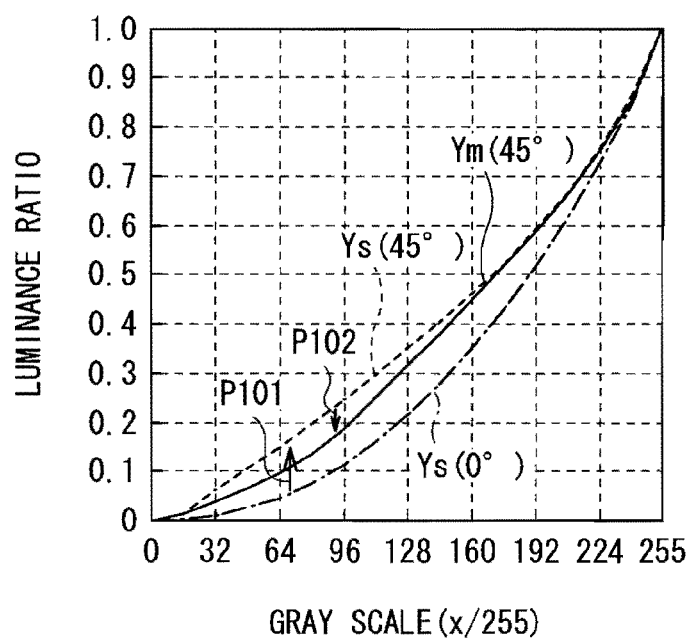
FIG. 11 is a characteristic chart showing a typical relationship between the gray scale of a video signal and the luminance ratio in the front direction of an LCD panel in a direction of 45° of the LCD panel in a liquid crystal display of related art.
Figure 12:
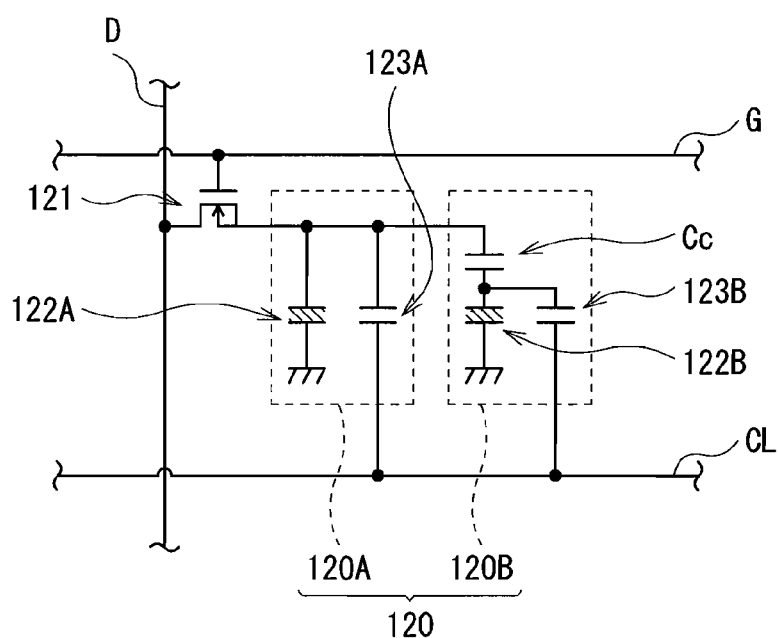
FIG. 12 is a circuit diagram showing a pixel configuration in the liquid crystal display of related art.
Figure 13:
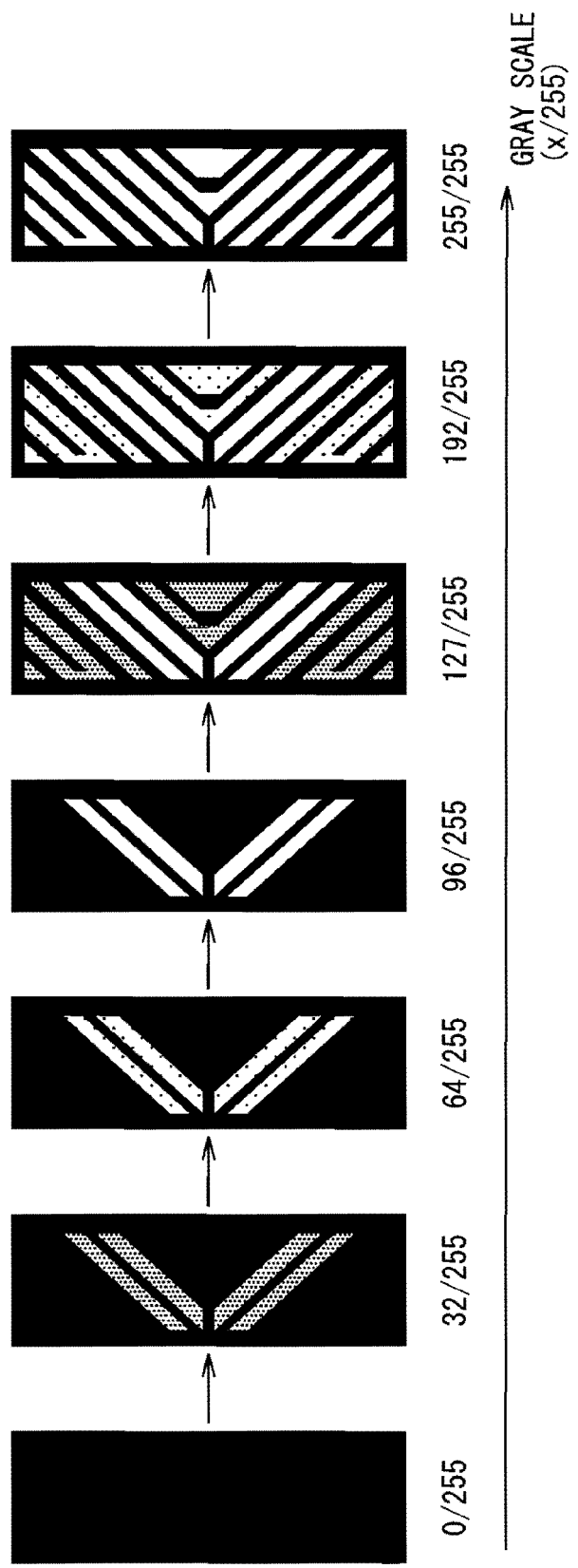
FIG. 13 is a plan view showing an example of relationship between the gray scale of a video signal and display mode of respective sub pixels in a multi-pixel structure of related art.
Figure 14:
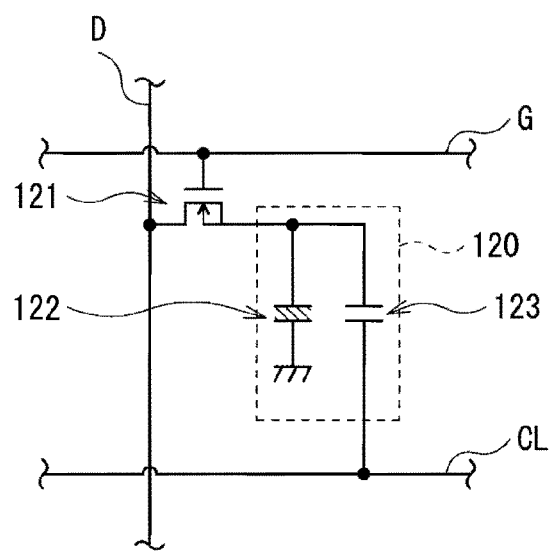
FIG. 14 is a circuit diagram showing a pixel configuration in another liquid crystal display of related art.

Next, a second embodiment of the present invention will be described with reference to FIG. 10. FIG. 10 is a configuration example of a pixel circuit formed in each pixel 10 of the liquid crystal display according to the present embodiment.

In the present embodiment, an auxiliary capacitance line CL is shared between the sub pixels 10A and 10B, while the ratio of auxiliary capacitance Cs1 of an auxiliary capacitive element 13A to auxiliary capacitance Cs2 of an auxiliary capacitive element 13B, that is, "Cs1/Cs2", differs from the ratio area of the sub pixel 10A to the sub pixel 10B in each pixel 10. Namely, the ratio of the capacitance (LC capacitance Clc1) of a liquid crystal element 12A to the capacitance (the auxiliary capacitance Cs1) of the auxiliary capacitive element 13A, that is, "Clc1/Cs1", differs from the ratio of the capacitance (LC capacitance Clc2) of a liquid crystal element 12B to the capacitance (the auxiliary capacitance Cs2) of the auxiliary capacitive element 13B, that is, "Clc2/Cs2". It is to be noted that the liquid crystal display of the present embodiment has the same configuration as the liquid crystal display 1 of the first embodiment except for the above-mentioned points. Accordingly, the liquid crystal display of the present embodiment has advantages such excellent viewing angle characteristic of luminance, high aperture ratio, and compact configuration, as with the above-mentioned first embodiment. In particular, in each pixel 10, since the one auxiliary capacitance line CL is shared in common between the sub pixels 10A and 10B instead of providing the auxiliary capacitance lines CL1 and CL2 for the sub pixels 10A and 10B respectively, the number of the auxiliary capacitance lines can be reduced (halved) as a whole, thereby more compact configuration is available.

Now the method of manufacturing a liquid crystal display of the present embodiment will be explained with reference to a circuit diagram of FIG. 10 together with a flow chart of FIG. 7 and cross section views of FIGS. 8 and 9. It is to be noted that hereinbelow, detailed description will be made for those different from the above-mentioned first embodiment, and will be suitably omitted about the other points of view.

As with the above-mentioned first embodiment, first, after producing a TFT substrate 22 and a CF substrate 32 (step S101), a liquid crystal layer 40 is sealed between the TFT substrate 22 and CF substrate 32 with alignment films 23 and 33 in between (step S102). Subsequently, as shown in FIG. 9, a specified electric field is applied to the liquid crystal layer 40 by applying voltages Vcs1 and Vcs2 across a pixel electrode 20A and a counter electrode 30 and across a pixel electrode 20B and a counter electrode 30 at the same time, thereby a liquid crystal molecule 40A is aligned at a tilt (step S103). Specifically, the mutually different voltages Vcs1 and Vcs2 are applied to the sub pixels 10A and 10B respectively by means of the auxiliary capacitance line CL, under the condition that TFT elements 11A and 11B are closed and voltage application from the data line D is set to 0 V. In this case, in the present embodiment, it becomes possible, by setting the reference potential of the auxiliary capacitance line CL to any value other than 0, to apply voltages Vcs1 and Vcs2 to the sub pixels 10A and 10B according to the ratio of the auxiliary capacitance Cs1 of the auxiliary capacitive element 13A to the auxiliary capacitance Cs2 of the auxiliary capacitive element 13B. Accordingly, a direct-current electric field is applied in a direction forming a specified angle with the surface plane of glass substrates 21 and 31, thereby making the liquid crystal molecule 40A aligned in a given direction with respect to the normal to the glass substrates 21 and 31. As a result, it becomes possible to control the magnitude of pretilt angles θ1 and θ2 of the liquid crystal molecule 40A by appropriately determining the ratio of the auxiliary capacitance Cs1 to the auxiliary capacitance Cs2 and adjusting the magnitude of voltages Vcs1 and Vcs2. Further, the monomer 40C is polymerized by applying ultraviolet light UV while the voltages Vcs1 and Vcs2 are kept applied to form the polymer 40B adhered to the surface of the alignment films 23 and 33 (step S104). Thus, the liquid crystal display of present embodiment is completed through the above-mentioned fabrication process.

Now it is found that such method of manufacturing the liquid crystal display according to the present embodiment is also capable of obtaining the same effect as the above-mentioned first embodiment. However, in order to reduce the difference of the feed-through voltage between the sub pixel 10A and the sub pixel 10B as small as possible to avoid disagreement in the optimum value of a counter voltage (potential difference between the pixel electrode 20 and the counter electrode 30) between the sub pixels in the present embodiment, it is necessary that the parasitic capacitance Cgs (not shown) between the gate of TFT element 11A and the sub pixel 10A should be different from the parasitic capacitance Cgs (not shown) between the gate of TFT element 11B and the sub pixel 10B. From this point of view, it seems that the liquid crystal display of the above-mentioned first embodiment is more adapted to simple and easy fabrication.

As mentioned above, the present invention has been described with reference to some embodiments, but the present invention is not limited to the above-mentioned embodiments, and various modifications are available. For example, although the case where one pixel is constituted from two sub pixels has been explained in the above-mentioned embodiments, the present invention is not limited to this and may be configured so that one pixel may be constituted from three sub pixels or more.

In the above-mentioned embodiments, a polymerizable monomer is included in the liquid crystal layer then polymerized to form a polymer structure, but it is not limited to this. For example, the polymer structure may be formed by polymerizing the polymerizable monomer contained in the alignment film.

In the above-mentioned embodiments, although the case of using the VA-mode liquid crystal element is explained, the present invention is not limited to this and the case of using the TN-mode liquid crystal element is also applicable, for example.

Obviously many modifications and variations of the present invention are possible in the light of the above teachings. It is therefore to be understood that within the scope of the appended claims the invention may be practiced otherwise than as specifically described.

What is claimed is:

1. A liquid crystal display comprising:
a pair of signal lines extending so as to intersect each other;
a pixel provided for the pair of signal lines and configured of a plurality of sub pixels, each sub pixel including a liquid crystal element and a capacitive element;
a driving element provided for each of the plurality of sub pixels so as to be connected to a corresponding pair of signal lines assigned to the pixel, and configured to perform display driving by applying a voltage to each liquid crystal element based on a video signal; and
a capacitance line provided for each of the plurality of sub pixels, each capacitance line being connected to a first end of a capacitive element of a respective sub-pixel,
wherein
a second end of a respective capacitive element of a respective sub-pixel is connected to the driving element in common with the respective liquid crystal element, and
each liquid crystal element includes liquid crystal molecules whose pretilt angle in a non-driving state differs between the plurality of sub pixels of the same pixel.

2. A liquid crystal display comprising:
a pair of signal lines extending so as to intersect each other;
a pixel provided for the pair of signal lines and configured of a plurality of sub pixels, each sub pixel including a liquid crystal element and a capacitive element;
a driving element provided for each of the plurality of sub pixels so as to be connected to a corresponding pair of signal lines assigned to the pixel, and configured to perform display driving by applying a voltage to each liquid crystal element based on a video signal; and
a capacitance line provided for the plurality of sub pixels in the pixel, and connected, in common, to a first end of each of the capacitive elements in the plurality of sub pixels,
wherein
a second end of each capacitive element is connected to the driving element in common with the respective liquid crystal element,
a ratio of a capacitance between the liquid crystal element and the capacitive element differs between the plurality of sub pixels of the same pixel, and
the liquid crystal element includes liquid crystal molecules whose pretilt angle in a non-driving state differs between the plurality of sub pixels of the same pixel.

3. A method of manufacturing a liquid crystal display which includes a pair of signal lines so as to intersect each other, and a pixel provided for the pair of signal lines and configured of a plurality of sub pixels, each sub pixel including a liquid crystal element and a capacitive element, the method comprising the steps of:

forming a driving element for each of the plurality of sub pixels, the driving element performing display driving by applying a voltage to the liquid crystal element based on a video signal, and connecting, in common, all of the driving elements formed in the pixel to a corresponding pair of signal lines assigned to the pixel;

forming each liquid crystal element and each capacitive element so as to be connected, in common, to a corresponding driving element; and forming a capacitance line for each of the plurality of sub pixels, each capacitance line being connected to a respective capacitive element at one end thereof opposite to the driving element, wherein each liquid crystal element is formed in such a manner that, after sealing, between a pair of electrode substrates, a liquid crystal layer containing polymerizable monomers and liquid crystal molecules, each electrode substrate having an alignment film on its inner facing surface, all the monomers in the pixel are polymerized by one operation during an application of voltages, which are mutually different between the plurality of sub pixels, the voltages being applied across the pair of electrode substrates by means of the respective capacitance lines, and each liquid crystal element includes liquid crystal molecules whose pretilt angle in a non-driving state differs between the plurality of sub pixels of the same pixel.

4. A method of manufacturing a liquid crystal display which includes a pair of signal lines so as to intersect each other, and a pixel provided for the pair of signal lines and configured of a plurality of sub pixels, each sub pixel including a liquid crystal element and a capacitive element, the method comprising the steps of:

forming a driving element for each of the plurality of sub pixels, the driving element performing display driving by applying a voltage to the liquid crystal element based on a video signal, and connecting, in common, all of the driving elements formed in the pixel to a corresponding pair of signal lines assigned to the pixel;

forming each liquid crystal element and each capacitive element so as to be connected, in common, to a corresponding driving element, so that ratio of a capacitance between a respective liquid crystal element and a respective capacitive element differs between the plurality of sub pixels; and forming a common capacitance line so as to be connected to all the capacitive elements in the pixel at each one end thereof opposite to the driving element, wherein each liquid crystal element is formed in such a manner that, after sealing, between a pair of electrode substrates, a liquid crystal layer containing polymerizable monomers and liquid crystal molecules, each electrode substrate having an alignment film on its inner facing surface, all the monomers in the pixel are polymerized by one operation during an application of voltages, which are mutually different between the plurality of sub pixels, the voltages being applied across the pair of electrode substrates utilizing the difference in the ratio of the capacitance between the respective liquid crystal element and the respective capacitive element, and each liquid crystal element includes liquid crystal molecules whose pretilt angle in a non-driving state differs between the plurality of sub pixels of the same pixel.

* * * * *